United States Patent [19]

Howery

[11] 4,076,619

[45] Feb. 28, 1978

[54] HYDROPHILIC ACRYLIC POLYMERS AS MARINE FILTERS, ALGAE GROWTH CATALYSTS, AND BREEDING STIMULUS FOR FISH AND INVERTEBRATES

[75] Inventor: Kenneth A. Howery, South Orange, N.J.

[73] Assignee: Polymetrics International Inc., New York, N.Y.

[21] Appl. No.: 795,193

[22] Filed: May 9, 1977

Related U.S. Application Data

[63] Continuation-in-part of Ser. No. 627,384, Oct. 30, 1975, abandoned.

[51] Int. Cl.$^2$ .................. B10D 15/00; C02B 1/14
[52] U.S. Cl. ............................ 210/36; 119/5; 210/40; 210/65; 210/169; 210/502; 252/428; 252/430

[58] Field of Search ............ 210/29, 36, 40, 41, 210/65, 169, 196, 197, 500 R, 501–504, DIG. 28–DIG. 31; 252/60, 61, 175, 182, 184, 190, 410, 426, 428, 430; 119/1–5

[56] References Cited

U.S. PATENT DOCUMENTS

| 2,963,441 | 12/1960 | Dolian | 252/428 |
| 3,217,032 | 11/1965 | Taka et al. | 252/428 |

*Primary Examiner*—Frank Sever

[57] ABSTRACT

Solutions and pelletized forms of a cross-linking, water-base hydrophilic acrylic polymers selectively absorb toxic marine life waste materials in natural or synthetic sea water.

A hydrophilic acrylic polymer used in the present invention, unlike other polymeric and even hydrophilic polymeric materials, is applied as a film-forming coating or dispensed in bulk as pellets, in order to provide a healthful and natural marine like environment in accordance with the invention.

6 Claims, No Drawings

HYDROPHILIC ACRYLIC POLYMERS AS MARINE FILTERS, ALGAE GROWTH CATALYSTS, AND BREEDING STIMULUS FOR FISH AND INVERTEBRATES

This is a continuation-in-part of U.S. patent application Ser. No. 627,384, filed Oct. 30, 1975 now abandoned.

It is an object of the invention to provide a novel hydrophilic polymeric solution or pellets or other subdivided solid form which when respectively:
(a) applied as a coating to plastic fibrous materials or plastic matrix materials used as filters or
(b) dispensed in the form of pellets or other subdivided solid form used as a filtration medium
uniquely accelerates removal of marine wastes and facilitates algae growth essential to the establishment and maintenance of hearty marine life in natural or synthetic sea water.

Additional features of this invention are:
(1) Absorbs ammonia and nitrites from the natural or synthetic sea water
(2) Does not remove or interfere with the major salt components in synthetic or natural sea water as does activated carbon and synthetic ion exchange resins.
(3) Does not remove trace elements such as vanadium, iron, manganese, berylium, titanium, etc. as does charcoal and other commonly used filter materials.
(4) Provides an environment for accelerated nitrogen-cycle bacteria ie, nitrosomas and nitrobacteria.
(5) Increases the effective surface area of undergravel and other type filters.
(6) Provides a superior medium for bacterial growth other than conventional gravel type materials such as dolomite, crushed oyster shells and coral sand, therby sustaining and multiplying marine life over long periods of time.
(7) Provides supplemental medium or marine barrier for enlargement of the carrying capacity of the marine environment, ie., under gravel filtration.
(8) Eliminates disturbing effect of the filtration system by marine inhabitants i.e., fish and invertibrates.
(9) Eliminates the need for activated charcoal or ion exchange resins in closed marine systems.
(10) Creates a regenerative absorbtion environment in closed marine systems.
(11) Drastically shortens marine tank or other marine culture environment set-up time essential to sustain marine life.
(12) Non toxic environment created by use of of acrylic polymer encourages breeding of marine fish and invertebrates, i.e., the polymer absorbs excessive amounts of detrius, a source of contamination in open or closed marine systems.
(13) Permits the encapsulation and release of live algae spores and algae growth stimulants into the liquid or solid forms of the hydrophilic acrylic polymeric materials so as to stabilize marine environment and encourage breeding.
(14) Temporarily reduces ammonia and nitrates below dangerous toxic levels in sea and synthetic salt water while bacteria cycle imbalance is adjusted.
(15) Supports greater numbers of marine life, i.e., fish and invertebrates per unit volume of sea or synthetic salt water.
(16) Sustains nitrogen-cycle balance through rapid temperature increases above 80 degrees Farenheit, normally fatal in fish and invertebrates.
(17) Removes metals, viz., copper, from fresh water in half the time of activated carbon and to levels of essentially zero parts per million.
(18) Water changes in an aquarium can be reduced drastically from once a month to once every six months and the only water added while a filter material of the invention is in the system is to cover evaporation losses.

DESCRIPTION OF THE PREFERRED EMBODIMENTS OF THE INVENTION

The polymeric coatings and the pelletized forms of the acrylic polymer of the invention are both hydrophilic and hydrophobic. Hydrophilic in that the acrylic polymer coating and pellets will pass both water vapor and gases through both the coating and pellet forms of the polymer while simultaneousy absorbing water and swelling the coating and pellets.

Hydrophobic in that both the acrylic polymer coating and pellets will absorb only a predetermined amount of water, i.e. up to 20 percent by volume depending upon the solids percentage of the original formulation. Further, water absorbtion of the acrylic polymer softens both the coating and pellet surface and as such eliminates any possibility of physical irritation or damage to marine life from rubbing against the acrylic polymeric material when used as pellets or as a coating. Preferably the hydrophilic acrylic polymer when used as a coating or in pellet form shall release no more than 0.1 parts per million of ammonia or other marine life toxicants into natural or synthetic sea water in a 72 hour continuous time increment.

Preferably, the acrylic polymer is a copolymer of at least one alkyl acrylate or methacrylate and acrylic acid. The alkyl of the alkyl acrylate or methacrylate can be varied within reasonable limits without effecting the characteristics of the polymer. Acid proportion range can be from five to forty percent by weight of carboxyl groups.

One type of copolymer that can be used contains at least one part of methyl and one part methyl methacrylate with acrylic acid.

The copolymer can also be formulated with the addition of a pre-polymer containing approximately thirty to forty percent methyl methacrylate, ethyl methacrylate and acrylic acid.

The solid content of the copolymer whether made with a prepolymer or with a polyethylenimine cannot vary below or above ten to eighteen percent.

The copolymer should contain about four to forty percent by weight of carboxyl groups as reactive sites for epoxy resins and multi-valent inorganic salts to effect cross linking.

Average molecular weight of the copolymer prior to cross linking may be between 100,000 and 300,000. After cross linking the molecular weight can be one million and greater. Critical to toxicity control in the marine life environment is control of acrylic polymer PH level within the range from neutral to eight.

The ratio of prepolymer or polyethylenimine derivative to acrylic polymer in the solution, coating or pellets of the invention can range from 1.5–20 to 1 preferably from 2–10 to 1.

The coating or pellet use of the hydrophilic acrylic polymer for stabilization of marine environments for fish and invertebrates when saturated is not rechargeable or recoverable and as such may be catagorized as replacement materials.

Coatings of the acrylic polymeric formulations may be formed by spraying, brushing or dipping.

Pelletizing of the acrylic polymeric formulations may be done by any conventional method provided solids curing of the pelletized polymer is done in air at temperatures ranging between 160° and 190° Farenheit or sufficient to release toxicants without melting or burning the polymers. Algae spores and marine life medication can be incorporated in the acrylic polymeric formulations for slow or controlled release into the synthetic or natural sea water.

The acrylic polymers formulations are preferably as follows:

| Ingredient | Percent by weight |
| --- | --- |
| 1. Water | 48–62 |
| 2. Aqueous solution containing 70% by weight of polymer containing<br>a) methyl methacrylate<br>b) ethyl methacrylate<br>c) acrylic acid | 10–18 |
| 3. Aqueous solution containing 40% by weight of<br>a) urea<br>b) polyethylenimine | 14–22 |
| 4. Aqueous solution containing 3% by volume of ammonia | 2.5–7.2 |
| 5. Epoxy resin | 3.5–7.2 |

The coatings of the formulations of the invention may be applied to substrates which are matrices, pads, pellets, beads or chunks or the like.

EXAMPLES

The following examples illustrate the invention as used to:
(1) To remove marine life waste materials from natural or synthetic sea water.
(2) Accelerate bacterial stabilization to sustain and encourage marine life in natural and synthetic sea water.

EXAMPLE #1 (Nitrogen-cycle balance)

In a tank containing synthetic sea water, under gravel plastic filters and polyester filter pads were coated prior to immersion with the following hydrophilic acrylic polymeric formulation. After immersion of the filters, a six percent solution of ammonium chloride was deposited in the sea water at the rate of two drops per gallon of sea water in the closed system. The latter is normally added to aid in obtaining a nitrogen-cycle balance capable of sustaining marine life in four to six weeks. The use of hydrophilic acrylic polymer coated filters created nitrogen-cycle balance so as to sustain marine life in only three days.

| Ingredients | Percent by weight |
| --- | --- |
| Water | 54.0 |
| 70% polymer containing methyl and ethyl methacrylate and acrylic acid | 12.9 |
| 40% solution of urea and polyethyleneimine | 21.1 |
| 3% aqueous ammonia | 7.2 |

-continued

| Ingredients | Percent by weight |
| --- | --- |
| Epoxy resin | 4.8 |

EXAMPLE #2
(Selected Marine Life Waste Removal)

Using the same hydrophilic and hydrophobic polymeric formulation of Example #1, for coating of undergravel filters and use of polymer pellets as filters in place of carbon, resulted in absorbtion of ammonia and nitrites from synthetic and natural saltwater without removal of trace elements essential for survival of marine fish and invertebrates. Ion exchange resins and activated carbon previously used as filtration mediums have a distinct disadvantage as filters for the following reasons:

(1) Ion exchange resins absorb to much salt and interfere quickly with the basic chemical balance necessary to sustain prolonged life of marine fish and invertebrates.
(2) Activated carbon removes trace elements along with waste products thereby, creating a detrimental effect in the marine environment.

In addition activated carbon used as a filter material absorbs waste materials and upon saturation, redeposits toxins through the osmotic balance process back into the marine environment causing detrimentual effects on the marine inhabitants.

Acrylic polymers are not limited to filtration of, as per the above mentioned, as they also absorb, simultaneously, other forms of organic debris, detrius, excretia, and saturated, and unsaturated fats, and acids detrimental to prolonged sustainance of fish and invertebrate life in synthetic and natural sea water.

The polymers as coating or pellets do thereby also eliminate the need for ozonizers and protein skimmers in open or closed marine systems. The commercial potential for the polymeric filters of the invention in waste purification and removal systems in cities and communities the world over is unlimited. The invention revolutionizes marine environmental and ecological philosophy.

EXAMPLE #3
(Encourages breeding of marine fish and invertebrates)

In a closed synthetic sea water system conditioned by using the polymers of example #1 as a coating on polyester filter material, placed upon the undergravel filter and covered with a mixture of dolomite and crushed oyster shell in place of an external filter using activated carbon or ion exchange resins. Several harlequin shrimp or clown shrimp (Hymenocera picta) were introduced for spawning. Due to the purity i.e. non toxicity of the synthetic saltwater environment, made possible by the use of polymeric filtration, spawning occurred within several months. Prior to this invention there was no record of successful spawning of these delicate invertebrates in a closed synthetic salt water system.

There is no limit to the potential of the invention, i.e. hydrophilic and hydrophobic acrylic polymeric filtration materials and processes for commercial breeding of fish and invertebrates, particularly for high priced items such as: shrimp and lobster now in short supply worldwide. The mortality rate in commercial breeding of invertebrates in the ocean and lakes is astounding;

whereas, mass breeding could be as high as ninty percent effective in open or closed systems using the polymeric filters of my invention.

EXAMPLE #4

Superior synthetic or natural saltwater environment for maintaining delicate fish and invertebrates.)

Prior to an invention using hydrophilic acrylic polymers as filter coatings and absorbtion pellets, it had been considered extremely difficult to establish and maintain a closed synthetic or natural saltwater system such that it will permit survival and growth of delicate fish and invertebrates for long periods of time.

By using filters dip coated with hydrophilic acrylic polymers and by immersing hydrophilic acrylic polymer pellets of the formulation in Example #1, in place of activated carbon and ion exchange resins, a superior marine life environment was created quickly. Life sustaining bacterial growth in two to three days was visually evident. Conventional gravel type filter material such as dolomite, crushed oyster shells and coral sand require six to twelve weeks to establish bacterial growth environment adequate to sustain marine life in a closed system. However, those type marine filters, as well as activated carbon and ion exchange resins, load up with waste products creating a toxic marine environment in several weeks.

The following list comprises a few of the delicate fish and invertebrates maintained in a marine environment for more than one year using the polymeric coating and pellets described in this invention.

Poma Canthus Imperator Semi-Circulatus
Pomacanthus
Zebra Soma Flavens
Labroides Dimidiatus
Amphirion Percula
Zebra Moray Eel
Conus Marmecellus
Arrow Crabs
Hymenocera Picta
Sabellidea, Hydroides
Gorgonian Coral
Tridact Clams
Acanthus Tang
Pinnatus Bat Fish
Centropyge Vroliky
Blue Linekia Starfish
Arthropods
Tunicates
Zebrasoma Flauchens
Coelenterates
Stoichactis Kenti
Stoichactis Discasoma
Radianthus Sp.
Cerianthus Sp.

EXAMPLE #5

(Increased carrying capacity for marine life in closed synthetic or natural sea water systems)

Gravel type filters i.e. dolomite, oyster shells and coral sand slowly develop nitrosomas and nitro bacteria type bacteria essential for nitrogen-cycle balance in closed natural and synthetic salt water systems. Constant physical disturbance by fish and invertebrates reduce bacterial growth and chemically limits the numbers of marine life that can be maintained in a closed system. The polymeric formulations illustrated in EXAMPLE #1 when coated on polyester filters and placed beneath gravel are unaffected by physical disturbances from marine life as they absorb nutrients bacteria feed upon; thereby allowing bacteria multiplication in such amounts as to increase the carrying capacity, i.e., fish and invertebrates, per unit volume of fluid by several hundred percent in natural and synthetic sea water systems.

EXAMPLE #6

(Increases effective surface area of filters and fluid purity)

The polymeric formulation of EXAMPLE #1 was used to coat undergravel filters and in solid or pellet form in place of activated carbon in external filters of natural and synthetic closed salt water systems. Daily tests for water purity were conducted over a six month period using La Motte water purity test kits. Uncoated marine systems we compared against systems containing hydrophilic acrylic polymeric coated under gravel filters and pellet type external filters.

After three weeks, water clarity and purity of the hydrophilic acrylic polymeric filter system improved two hundred and fifty percent over the conventional system. No deterioration of the synthetic or natural salt water or change in the clarity and purity of the water was found after a variety of fish and invertebrates were introduced into the system continuously during a six month test period. Bacteria growth continued unarrested during the test period and both fish and invertebrates in the system showed no signs of disease, lack of vitality or breeding capacity.

EXAMPLE #7

(Non removal of major salt components and trace elements)

Several natural and synthetic salt water closed marine systems using conventional under gravel filters and external activated charcoal and ion exchange resins as filters were compared over a one year period with systems using only hydrophilic acrylic polymer coated under gravel filters and external pellet filters of the formulation in EXAMPLE #1. Repeated atomic absorbtion flame emission tests were conducted over an eight month period to determine which type filter system was more effective to sustain marine life. The system containing under gravel filters in conjunction with activated carbon and ion exchange resin filters immediately began removing major salt components as well as such trace elements as vanadium, iron, manganese, berylium titanium and other metals essential for proper nitrogen-cycle balance in a closed salt water system containing fish and invertebrates. In a matter of weeks the delicate marine life expired and in less than four months the heartiest. varieties of fish and invertebrates began to expire.

After 9 months in a system protected by hydrophilic acrylic polymer coated under gravel filters and external filters containing only pellets formulated from the hydrophilic acrylic polymer, there was no loss of delicate or hearty varieties of fish and invertebrates. Further, the underground filters and pellets were replaced twice during the nine month period. Carbon and ion exchange systems would have had to be replaced approximately four to six times during the same period. It is a known fact in marine technology that carbon and ion exchange resins remove important and necessary salt engredients and metals in both open and closed salt water systems.

EXAMPLE #8

(Encapsulation of live algae spores and algae growth stimulants)

By encapsulating live algae spores and algae growth stimulants in the hydrophilic acrylic polymer of EXAMPLE #1, the inventor was able to release the live algae spores and algae growth stimulants into natural and synthetic sea water and fresh water in such manner as to begin bacteria growth in closed and open systems in less than one week; thereby shortening the nitrogen-cycle balance necessary to sustain marine life by 6 to 10 weeks. The prompt release and growth of algae also purifies the environment and as such induces faster and more prolific breeding of fish and invertebrates.

EXAMPLE #9

(Removal of ammonia from the polymer)

Marine biological studies have proven that ammonia in excess of two tenths parts per million in fresh water and natural or synthetic salt water will prevent breeding and will destroy a large majority of fish and invertebrates.

The polymeric formulation of EXAMPLE #1 is such as to absorb ammonia from the marine environment thereby removing a natural hazard in maintaining and breeding fish and invertebrates.

Ammonia used in formulating and fabricating solid filter pellets from the formulation in EXAMPLE #1 can be trapped in the polymer. As such if allowed to remain entrapped within the polymer pellets, is dangerous to marine life. The invention is such that the excess ammonia from the manufacturing process is driven from the polymer pellets prior to use as a filter material.

EXAMPLE #10

(Removal of disease control medications)

Disease control of fish and invertebrates, prior to this invention, has been inadequate in that materials such as activated carbon and other filter materials remove medication too quickly, i.e. almost instantaneously upon their introduction to an aquarium system. The sudden change in organic levels caused by the use of other filter mediums causes a shock situation which compounds the effect of the disease for which the fish and invertebrates are treated and the fish mortality rate is staggering.

In repeated tests using water in all parts of the World, the the invention when placed in a fresh or marine aquarium caused no shock effects and effected complete disease recovery of the fish and invertebrates when the invention i.e. hydrophilic filter was used to slowly remove organic-metallic complexes, antibiotics, fungicides, organic dyes, copper sulphate and formaldehyde type complexes.

The invention controls the rate at which it removes the disease control medication. Filtration or absorbtion occurs only after three hours and therefore slowly removes medication from the system to non-toxic water purity levels over a twenty four hour period. Other filter mediums remove medication from water in about twenty minutes to one hour in contrast to the invention. Example #1 formulation used in the above.

EXAMPLE #11

(Reduction in water changes)

Prior to this invention, fresh and salt water changes were required every 2 to 3 weeks regardless of the quantity of water and the means used to filter the system, i.e. carbon, ion-exchange resins, etc. Toxic build-up of waste materials, residual medication, etc. causes water to become murky in color and heavy in toxic ammonia content. Water was historically replaced every few weeks and the marine life suffered the effects of continuously varying water purity by reducing longevity and preventing breeding. Introduction of the invention, i.e. filter, into an aquarium maintained by professional breeders, aquarists, and State agencies proved conclusively that water changes were as infrequent as 6 months, water purity was held continuously below toxic levels. Water clarity was sparkling clear after less than 36 hours of the implementation of the filter and the only water added during the extended period was to replace that amount lost by evaporation. (Formula #1 used)

EXAMPLE #12

(Protection against malfunctioning biological filter)

Periodically in marine aquarium systems the biological filter malfunctions. The Nitrosomas bacteria no longer can break down the ammonia in a system and the result is an ammonia level surge up to toxic magnitudes that cannot sustain even the hardiest forms of marine life. Prior to the invention, i.e. hydrophilic filter, resins and carbon were used to partially remove the ammonia. However, the accelerated rate of removal shocked the marine life and other chemical deterioration of the system prevented reestablishment of the biological filter.

This reaction caused a decay in the water system and it was unable to sustain marine life for weeks after the biological filter malfunction.

The introduction of the hydrophilic filter, i.e. invention, in fresh and marine aquarium systems is similar to the installation of a safety valve in a hydraulic system. When the invention, filter medium, is placed in a fresh or marine aquarium it continuously adsorbs and absorbs organic and other toxicants so as to maintain water purity of 0.5PPM or less of ammonia. Unique only to this invention is the filter's ability during malfunction of the biological filter to absorb and adsorb excess ammonia and other toxicants, thereby reestablishing a nitrogen cycle balance. Simultaneous with the above is the self restoration of the biological filter. Example #1 formulation used herein. The aquarist and breeder need no longer fear failure or malfunction of the biological filter so long as the invention is in the aquarium system.

EXAMPLE #13

(Tap water pretreatment)

The purity of the water used in fresh water and in synthetic marine water for aquariums is critical to a) establishment of the biological filter, b) disease control, and c) maintenance of a non-toxic water environment.

The use of harsh chemical additives to water at municipal water treatment plants incorporates toxicants in water extracted from pipes in offices, dwellings, laboratories, etc. Such toxicants are injurious to fish and invertebrates.

A number of State owned laboratories, municipal research facilities, fish importers and breeders inserted the invention, i.e. filter, into devices feeding water to aquarium systems. Copper and other dangerous toxicants were adsorbed and absorbed from the flowing toxic waters to levels of nontoxicity as tested by conventional laboratory equipment subsequent to filling the aquariums and prior to using the water for other research programs.

Carbon and ion exchange resins took twice as long to filter the same toxic materials. However, those filter materials removed certain organics from water that are necessary to sustain marine life. Example #1 formulation used herein. The invention filtered the water to non-toxic purity levels without developing biologically harmful distilled water.

EXAMPLE #14

(Shock protection)

A delicate balance of filter medium quantities other than this invention as measured against the volume of water is critical for the support of marine life. Inaccurate measurements of carbon and ion exchange resins as a ratio to the amount of water used in an aquarium causes fast removal of organics, etc. from fresh and marine water. The invention is independent as to the volume of filter media used in the aquarium system to perform the intended function without harmful effects.

Removal of toxic organic materials from water in less than 12 hours causes a stress or shock condition fatal to marine life. In repeated tests over several years, the invention overcame the disadvantages of other filter mediums by eliminating the shock condition through removal of organic toxicants from the water slowly and predictably over a 12 to 24 hour filtration period. Some of the toxicants removed from the fresh and marine water were as follows:

| Urea | Formalin |
|---|---|
| Ammonia | Antibiotics |
| Ammonium | Detritus |
| Nitrate | Copper, iron, etc. |
| Nitrite | Fatty acids |
| Phosphate | Amino acids |
| Sulphates | Vitamin complexes |

The formulation from Example #1 was used for the above.

Additional Comments:

Most of the tests conducted have been in the laboratory type conditions on delicate aquarium specimens to both common and rare tropical fish and invertebrates. Results indicate extrapolation of the invention for commercial breeding of tropical fish and invertebrates as well as mass water purification of reservoirs, oceans, rivers and lakes is entirely practical and feasible.

What I claim is:

1. An aqueous system comprising a body of water constituting the habitat of fish and invertebrates, water contacting means within said body of water, said water contacting means comprising a material formed from a composition consisting of 48 to 62 weight percent water; 10 to 18 weight percent of an aqueous solution containing 70 weight percent of a polymer consisting essentially of 60–95 weight percent of at least one alkylacrylate or alkylmethacrylate and 5–40 weight percent acrylic acid; 14 to 22 weight percent of a forty percent by weight solids, prepolymer solution; 2.5 to 7.2 weight percent of a 3 percent by volume ammonia solution; and 3.5 to 7.2 weight percent of an epoxy resin; said contacting means functioning to selectively absorb toxic marine life waste materials from said body of water.

2. The system of claim 1 wherein said contacting means comprises coatings of the compositions of claim 1 on substrates or in subdivided solid form.

3. A water contacting material for improving the fish and invertebrate life maintaining chemical balance within a body of water constituting the habitat of fish and invertebrates, said material being formed from a composition consisting of 48 to 62 weight percent water; 10 to 18 weight percent of an aqueous solution containing 70 weight percent of a polymer consisting essentially of 60–95 weight percent of at least one alkylacrylate or alkylmethacrylate and 5–40 weight percent acrylic acid; 14 to 22 weight percent of 40 percent by weight solids, prepolymer solution; 2.5 to 7.2 weight percent of a 3 percent by volume ammonia solution; and 3.5 to weight 7.2 percent of an epoxy resin; said contacting material functioning to selectively absorb toxic marine life waste materials from said body of water.

4. The material of claim 3 in combination with substrates in the form of coatings or in subdivided solid form.

5. The process for improving the fish and invertebrate life sustaining chemical balance within a body of water constituting the habitat of fish and invertebrates, said process comprising the step of contacting said water with a material formed from a composition consisting of 48 to 62 weight percent water; 10 to 18 weight percent of an aqueous solution containing 70 weight percent of a polymer consisting essentially of 60–95 weight percent of at least one alkylacrylate or alkylmethacrylate and 5–40 weight percent acrylic acid; fourteen to twenty-two weight percent of a forty percent solids, prepolymer solution; 2.5 to 7.2 weight percent of an epoxy resin; said material functioning to selectively absorb toxic marine life waste materials from said body of water.

6. The process of claim 5 wherein said material is a coating on substrates or is in subdivided solid form, and said water is passed through a bed of said material.

* * * * *